(No Model.)

C. H. HUDSON.
CORKSCREW.

No. 353,860. Patented Dec. 7, 1886.

Witnesses
C. W. Benjamin
John Morris

Inventor
Charles H. Hudson
By L. A. Hill & Co
Attys.

UNITED STATES PATENT OFFICE.

CHARLES H. HUDSON, OF NEW YORK, N. Y.

CORKSCREW.

SPECIFICATION forming part of Letters Patent No. 353,860, dated December 7, 1886.

Application filed January 8, 1886. Serial No. 188,031. (No model.)

*To all whom it may concern:*

Be it known that I, CHARLES H. HUDSON, a subject of the Queen of Great Britain, and a resident of New York, in the county and State of New York, have invented certain Improvements in Corkscrews, of which the following is a specification.

My invention relates especially to devices employed for removing corks from bottles, and has for its object the provision of a corkscrew, simple in construction, easy to operate, and wherein the parts may be adjusted to suit different sizes of bottles and length of cork, and wherein means are provided for readily discharging the cork from the screw.

My invention consists, essentially, in a main shell or barrel adapted to rest upon the cork or neck of the bottle, and having different diameters forming a series of steps, and bearing two arms at top, said arms being provided with hooks, and with cutting, sawing, or filing edges for removing wax, wire, string, &c., from the neck of the bottle and extremity of the cork. The top of the shell is provided with a screw-threaded perforation wherewith engages the preferably screw-threaded shank of the corkscrew, said shank being surmounted by a manipulating knob or handle. I also provide a name-plate cast in the head of the screw, and means for adjustably holding the screw at any point in the shell, regulating the distance the point enters the cork, all of which will be hereinafter first fully described and then pointed out in the claims.

Figure 1:
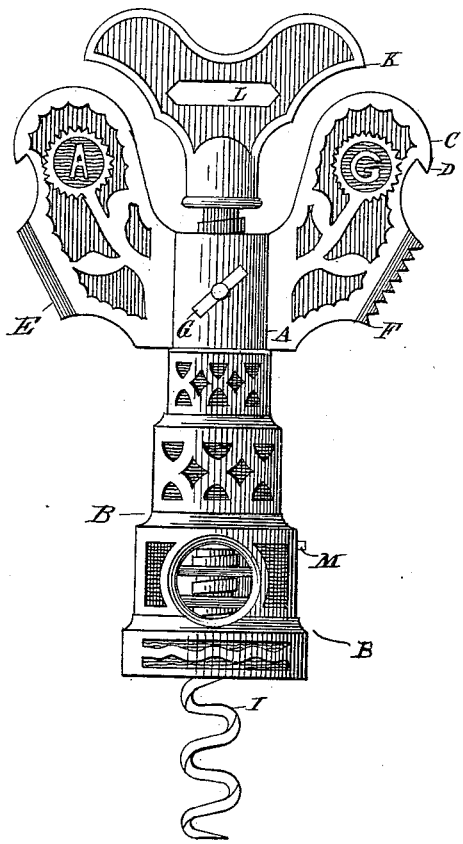
Figure 2:
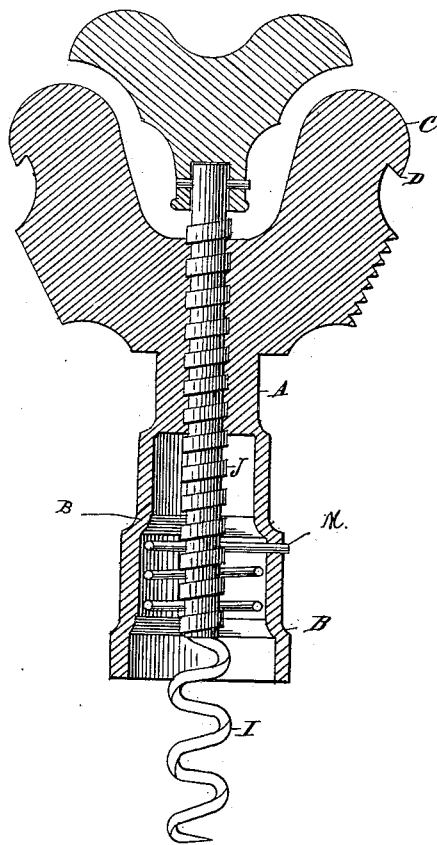
Figure 4:
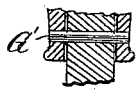
Figure 3:
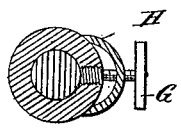

In the drawings, Figure 1 is a side elevation of my improved corkscrew and Fig. 2 is a vertical sectional view thereof. Fig. 3 shows a method of arranging the set-screw passing through the shell, and Fig. 4 represents a modification of my set-screw.

Like letters of reference wherever they occur indicate corresponding parts in all the figures.

A is the shell or barrel, formed of any approved material, and provided at its lower extremity with steps B. The shell is perforated at the top, said perforation being screw-threaded, as plainly indicated.

Upon each side of shell A are formed manipulating-arms, C, said arms being provided with a hook or hooks, D, for severing wire, string, &c., and with a blade, E, and a saw or file, F, said devices enabling the operator to easily remove any wax, wire, string, tin-foil, or other covering from the neck of the bottle.

G is a set-screw passing through shell A, and arranged to bear against the shank of the corkscrew, to hold the same rigidly in place when it is desired to regulate the distance it shall penetrate the cork. In the modification shown in Fig. 3 the shank of the set-screw is made small and passes through a securing-cap, H, rigidly attached to the shell A, preventing the withdrawal and loss of the screw; or, if desired, the shell and shank may be rigidly united by a pin, G', passing through the whole, as is clearly shown in Fig. 4, and the arms upon the top of the shank may be dispensed with.

I is the corkscrew, extending from a preferably screw-threaded shank, J, said shank being surmounted by a manipulating thumb-piece or knob, K, wherein is a name-plate, L. The position of the shank J may be changed by turning the same in cases where it is threaded, the screw-thread engaging with the thread in the perforation in the top of the shell A, or by simply raising or lowering it when the shank is not threaded, the parts being rigidly held together in either case by means of the set-screw G.

M is a spring fitting into the shell, and finding a seat upon one of the steps B, said spring forcing the cork from the screw when removed from the bottle.

Springs of different sizes are provided to fit the different diameters of the shell to conform to the size of the cork and bottle wherewith my improved corkscrew is employed.

Having now fully described my invention, what I claim as new therein, and desire to secure by Letters Patent, is—

1. The combination, with a corkscrew of the character herein specified, of the shell and a spring surrounding the extracting-screw seated upon a step placed at the lower extremity of and within the shell, substantially as shown and described.

2. The combination, with the shell or barrel A and corkscrew I, of a removable spring, M, said spring surrounding the extracting-screw, and being seated upon one of the steps placed at the lower extremity of and within the shell or barrel, substantially as shown and described.

3. The combination, with the shell or barrel A, provided at its lower extremity with steps B and at top with arms C, of the spring M and corkscrew I, said spring surrounding the extracting-screw and being seated upon one of the steps placed at the lower extremity of and within the barrel or shell, substantially as shown and described.

4. In a device of the character herein specified, the combination, with the shell or barrel A, provided with steps B, as set forth, and with the preferably screw-threaded shank of the corkscrew I, of a set-screw adapted to hold the parts rigidly together, substantially as shown and described.

Signed at New York, in the county of New York and State of New York, this 4th day of January, A. D. 1886.

CHARLES H. HUDSON.

Witnesses:
JAS. B. KILSHEIMER,
WALDO MORGAN.